Patented July 14, 1953

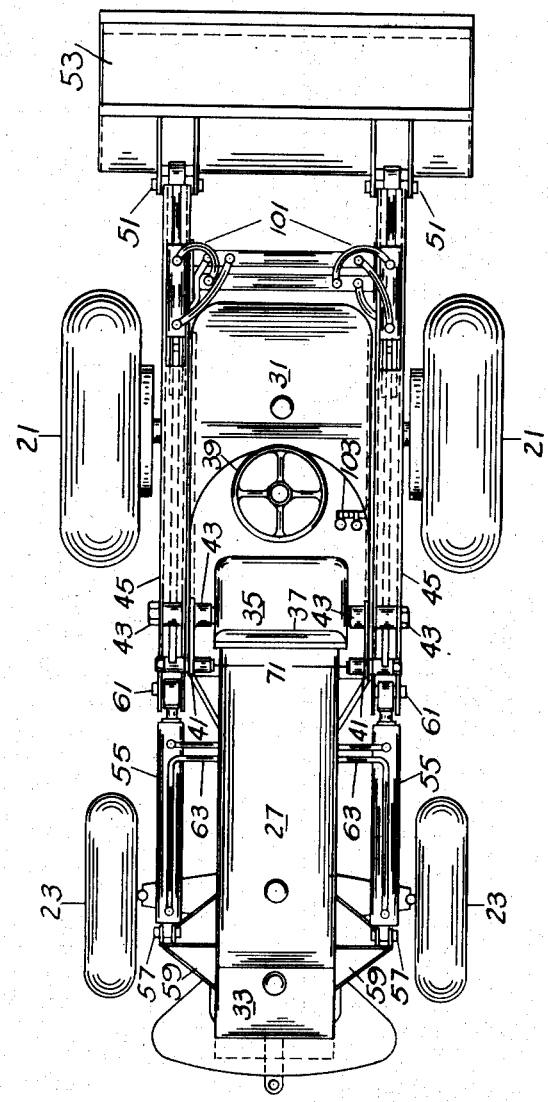

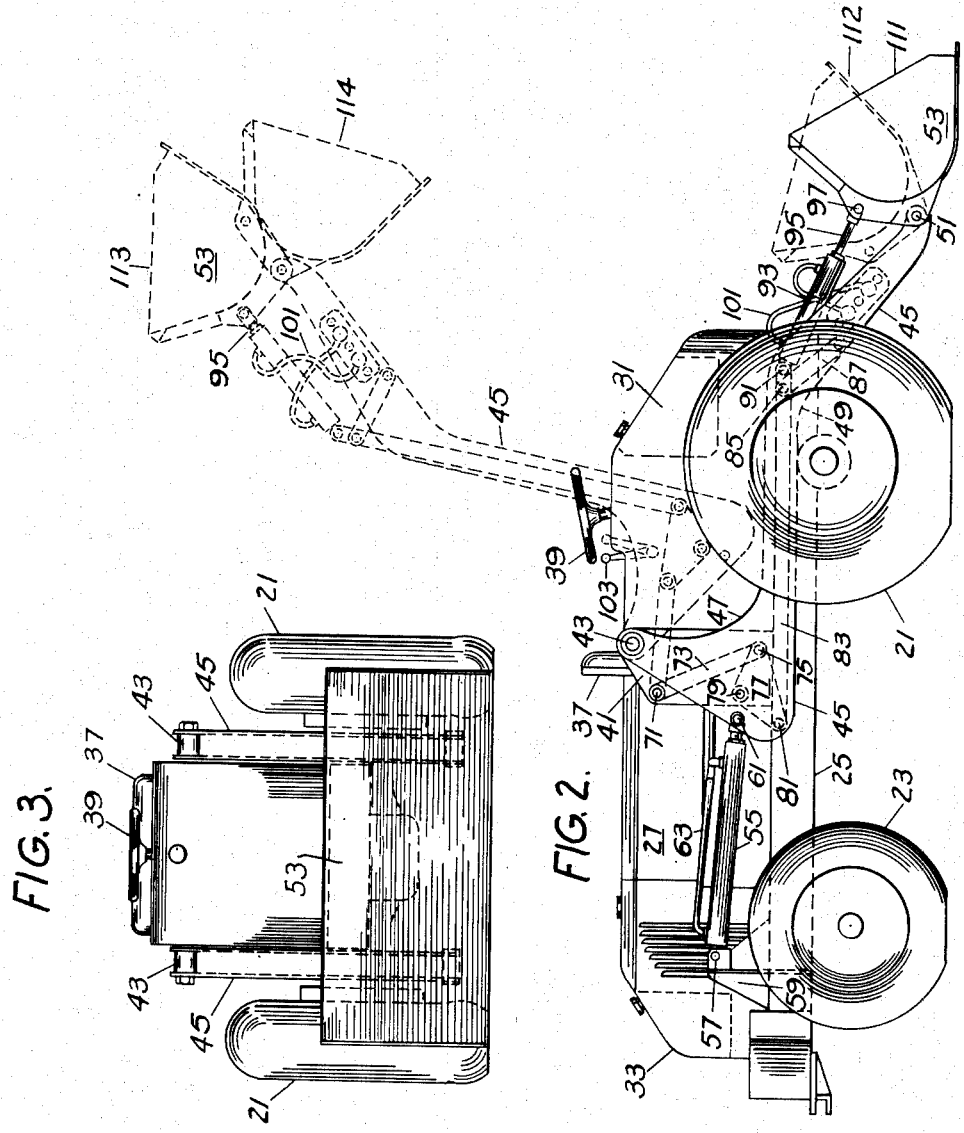

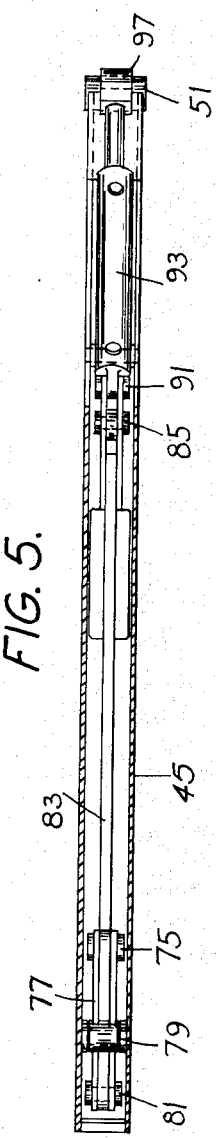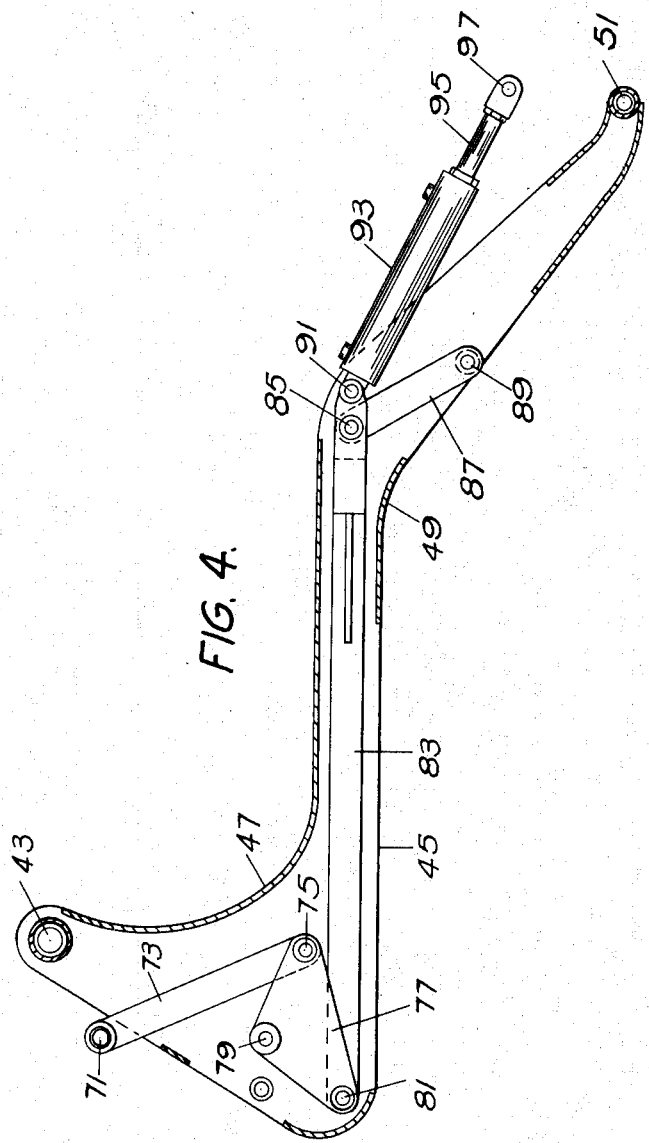

2,645,369

UNITED STATES PATENT OFFICE 2,645,369

POWER LOADER

Frederick W. Allan, Batavia, N. Y.

Application March 15, 1950, Serial No. 149,680

3 Claims. (Cl. 214—140)

This invention relates to a power loader, which is a machine for picking up earth or various other articles from the ground level or approximately the ground level and elevating them and depositing them in an elevated position, such as into the body of a truck. The appliance consists in general of an automotive vehicle such as a tractor, having mounted thereon a pair of long booms pivotally arranged to swing upwardly and downwardly in approximately vertical parallel planes, the free ends of the booms being attached to a suitable load carrying element such as a bucket or shovel, or a hook to which a chain or sling may be attached, there being also power means for raising and lowering the booms as required, and for tilting the load carrying element forwardly or backwardly to and from loading, holding, and discharge positions.

Loaders of this general type are well known. The objects of the present invention are to provide an improved construction for the swinging booms and associated tilt control parts, to give the operator better visibility and greater freedom of movement, and to eliminate certain accident hazards which have existed in previous designs of equipment of this same general nature.

These and other desirable objects are accomplished by the construction disclosed as an illustrative embodiment of the invention in the following description and in the accompanying drawings forming a part hereof, in which:

Fig. 1 is a plan of a loader in accordance with a preferred embodiment of the invention;

Fig. 2 is a side elevation thereof with the load carrying booms shown in their lower positions in full lines and in their upper position in dotted lines;

Fig. 3 is a front elevation of the loader;

Fig. 4 is a vertical section taken longitudinally through one of the supporting booms, with the interior control linkage in side elevation; and Fig. 5 is a diagrammatic horizontal section taken longitudinally through the supporting boom shown in Fig. 4.

The same reference numerals throughout the several views indicate the same parts.

The apparatus comprises a suitable automotive vehicle such as a tractor having a pair of driven wheels 21 and a pair of steerable wheels 23 supporting a main frame 25 on which are mounted, within a suitable external casing 27, an internal combustion engine which may be connected as desired to the driven wheels 21, and which also drives a hydraulic power pump. The engine is supplied with fuel from a fuel tank 31, and a hydraulic fluid reservoir 33 provides a supply of fluid for the hydraulic power system. A driver's seat 35 with a backrest 37 is positioned so that the driver faces the driven wheels 21, and has the steerable wheels 23 at his back. The end of the vehicle at which the power or driven wheels 21 are located is thus the front end. The steerable wheels 23 are controlled by a steering wheel 39 just in front of the driver's seat 35.

The parts thus far described are conventional in apparatus of this same general character.

In order to give the driver or operator adequate visibility of the ground immediately in front of the vehicle, so that he can see the pile of material which is to be picked up and loaded by this apparatus, the driver's seat must be close to the front end, as here shown. Yet in order that the bucket, shovel, or other load carrying unit may be elevated sufficiently high so as to be able to dump its load into a high truck body or the like, the load carrying unit must be mounted on relatively long booms. Unless these booms are to extend an excessive distance forwardly from the front end of the vehicle, the booms must, accordingly, be pivoted to the vehicle considerably rearwardly from the front end thereof, and it is customary in apparatus of this kind to pivot the booms to the vehicle at pivot points located approximately in the transverse plane of the backrest of the driver's seat, and at an elevation a little above the level of the seat itself, so as to be able to raise the load as high as possible without unduly increasing the lengths of the booms. With the conventional arrangement of booms extending approximately straight from the main pivot to the load carrying unit or element, it is apparent that when the load carrying element is in its uppermost position, the booms extend obliquely upwardly past and closely adjacent to the shoulders and head of the driver or operator. This interferes seriously with the lateral or side vision of the operator, such lateral vision often being necessary to enable the operator to correlate his activities with those of other workmen in the vicinity. Moreover, if the driver, with the conventional construction, wishes to extend one of his own arms sideways to give a hand signal to some other workman, his arm must extend outwardly below the supporting booms, with consequent danger that his arm may be hit and endangered by the supporting booms when they swing downwardly, unless the apparatus is shielded to prevent the driver's arm from being thrust out laterally below the supporting boom; and if such shielding is employed, this further interferes with the necessary lateral vision of the driver when the supporting booms are in their uppermost position.

To overcome these difficulties and dangers of the prior constructions is the principal purpose of the present invention. Rigidly secured to the vehicle frame 25 or other suitable fixed part of the vehicle are a pair of bracket plates 41 on opposite sides of the driver's seat, and on these bracket plates are securely mounted the fixed pivots 43 of the main supporting booms 45, one on each side of the vehicle. Instead of extending approximately straight from the pivots 43 to the shovel or other load holding unit, as is done in the prior constructions, the present booms are of angular or somewhat L-shaped bell crank lever construction so that, when in their lowermost positions, they first extend downwardly as a rearward arm of the bell crank from the pivots 43 to an elevation approximately at the level of the floor of the driver's compartment and just above the main axle of the driven wheels 21; then curve forwardly at 47 and extend approximately horizontally forwardly as a forward long arm of the bell crank (approximately at a right angle to the first part of the boom) to a point a little in front of the main axle; then at 49 these forward arms extend obliquely downwardly again to their forward end pivots 51, between which pivots 51 of the two booms there is mounted the load holding or carrying device or unit, such as the bucket type shovel 53 which itself may be of conventional construction.

With this shape of the main supporting booms, it is seen that when the booms are in their lowermost position, shown in full lines in Fig. 2, the load holding member 53 is down at the ground level, as intended. When the booms are swung up to their maximum upward position to elevate the load holding unit 53 as far as possible, as shown in dotted lines in Fig. 2, the special shape of these main supporting booms 45 insures that the arms will first extend forwardly and slightly downwardly from the pivots 43, and will not extend upwardly above the level of the pivots 43 until they reach a forward position approximately at or a little in front of the steering wheel 39. Thus the driver sitting in the seat 35, 37 has adequate lateral vision at all times, since the booms 45 never, in any position, come up past the sides of his head. Also, the driver has great freedom of movement in extending his own arms sideways for giving hand signals to other workmen, without any danger that his hands or arms will be caught and injured by the main supporting booms 45 as they descend.

For controlling the upward and downward movements of the booms 45, there are a pair of hydraulic cylinders 55 mounted at opposite sides of the vehicle, the rear ends of these cylinders being pivoted at 57 to strong bracket plates 59 mounted on the vehicle frame, and the forward ends of the piston rods of these cylinders being pivoted at 61 to the booms 45 at points considerably spaced from the pivots 43, as shown. Hydraulic conduit connections indicated in general at 63 lead from each cylinder 55 to the control valve and the hydraulic power source.

In addition to swinging the main booms 45 upwardly and downwardly to carry the work holding or load carrying element 53 bodily upwardly and downwardly, it is also necessary to provide means for tilting the element 53 relative to the booms 45, both for the purpose of shifting the element from a loading position to a carrying position and from a carrying position to a dumping position, and preferably also for the purpose of automatically tilting the load holding element relative to the booms 45 as the booms are raised and lowered to keep the load holding element in approximately a predetermined position relative to a horizontal plane during the raising and lowering operation. Exact synchronism of this automatic tilting with the raising and lowering movements is not required, it being sufficient if the automatic tilting device produces an approximation of such synchronized movement.

In order to accommodate the automatic tilting control, the main booms 45 are made hollow, each boom having two side plates laterally spaced from each other as best seen in Fig. 5, the side plates being joined to each other by cross braces or cross webs at various points along the top and bottom edges, as seen in Fig. 4.

At each side of the vehicle, a little below and to the rear of the main pivot 43 there is a second fixed pivot 71 on the bracket plate 41. To this fixed pivot is pivoted one end of a link 73 which extends downwardly inside the hollow rear short arm of the adjacent boom 45, and has its lower end pivoted at 75 to one end of a lever 77 which is of somewhat triangular or walking beam shape. Intermediate its ends, the lever 77 is pivoted at 79 on a pivot which is mounted rigidly in the side walls of the rear arm of the boom 45. The other end of the lever 77 is pivoted at 81 to a long link 83 which extends longitudinally through the straight central part of the forward arm of the boom 45, and near its forward end it has a guide pivot 85 pivoted to one end of a short guide link 87, the opposite end of which is pivoted at 89 to a pivot fixed to the downwardly disposed forward portion of the forward arm of the boom 45. The link 83 extends a little forwardly beyond the guide pivot 85 and at its forward end is pivoted at 91 to the rear end of a hydraulic cylinder 93, the piston rod 95 of which is pivoted at 97 to a second pivot on the load carrying element 53, spaced from the main pivot 51 thereof, as well seen in Figs. 2 and 4. Hydraulic conduit connections indicated in general at 101 extend from the hydraulic cylinder 93 to the control valves and to the hydraulic power source. The control valves, both for the cylinders 93 and the cylinders 55, are operated by one or more control levers 103 (Fig. 2) conveniently accessible to the operator to the right of his seat 35 and near the steering wheel 39.

Let it be assumed that the loader is to be used in loading a pile of sand into a truck. The hydraulic controls of the cylinders 55 and 93 are operated to move the main supporting booms 45 to their low position as shown in full lines in Fig. 2, and to tilt the shovel 53 forwardly till its forward side lies approximately flat on the ground in the position 111, as shown in full lines in Fig. 2. The vehicle is then run forwardly to force the shovel 53 into the pile of sand, whereupon the hydraulic controls of the cylinders 93 are operated to pull rearwardly on the pivot 97 to tilt the shovel rearwardly to the carrying position shown in dotted lines at 112 in Fig. 2, whereby the shovel is shifted to a more upright position so that the sand does not spill out of it.

The hydraulic controls of the cylinders 55 are operated to cause these cylinders to shove forwardly on the pivots 61, thus swinging the booms 45 bodily upwardly on their main pivots 43. As these booms swing upwardly, the pivots 79 on the booms will describe an arc about the main pivots 43 as a center, and the pivots 79 will be carried away from the fixed pivots 71, so that the links 73 will cause the levers 77 to turn on their pivots 79 in a counterclockwise direction on these pivots (when viewed as in Figs. 2 and 4) while the pivots 79 themselves are moving bodily with the booms 45. This counterclockwise motion of the levers 77 will, through the pivots 81, shove the long links 83 forwardly lengthwise of the straight central portions of the booms 45, the front ends of the links 83 causing a clockwise rocking of the short guide links 87 on their pivots 89. This forward motion of the links 83 will cause forward motion of the cylinders 93 so that, if these cylinders are not further actuated hydraulically, they will nevertheless push forward on the pivots 97 of the load carrying shovel, to tilt the shovel in a clockwise direction on its main pivots 51 in approximate synchronism with the counterclockwise motion of the main booms 45 on their main pivots 43. The proportions of the various links and levers, as best indicated in Fig. 4, are such that this automatic clockwise tilting of the shovel caused by the links and levers as the main booms swing upwardly, will approximately compensate for the rearward tilting which would otherwise be caused by the counterclockwise swinging of the main booms 45. If the shovel or bucket is approximately level at the beginning of its upward swing, it will still be approximately level at the end of its upward swing, although there may be some slight rearward tilting of the shovel as it comes up, but not enough to cause dumping of the load backwardly onto the operator.

When the load carrying shovel has been elevated to the required extent by operation of the main hydraulic cylinders 55, the vehicle is driven to the side of the truck in which the sand is to be loaded, and the controls are then operated to move the piston rods 95 of the hydraulic cylinders 93 forwardly, which will tilt the shovel 53 from the dotted line position shown at 113 (Fig. 2) forwardly to the dotted line dumping position shown at 114, thus dumping the load carried by the shovel.

This description of loading sand from a ground pile into a truck is given simply as a convenient illustration of one manner of use of the invention. The apparatus has wide usefulness in loading many kinds of materials and in transferring materials from one location to another.

It is noted that the links and levers which control the automatic tilting of the load carrying element 53 are enclosed within the hollow main booms 45 so that they do not add any obstruction to the vision of the driver, nor do they produce any accident hazard in the operation of the mechanism. Also it is noted that this automatic tilting linkage which produces the approximately parallel travel of the load carrying element 53, operates independently of the operation of the hydraulic cylinders 93, so that the shovel or bucket is maintained in an upright load-carrying position during its raising and lowering movements, without any necessity for the driver to make any manual control of the hydraulic cylinders 93 at this time. The hydraulic cylinders 93 are, however, operated through the manual control valves when it is desired to tilt the shovel or bucket from loading to carrying position, or from carrying to dumping position, or vice versa.

It is seen from the foregoing disclosure that the above mentioned objects of the invention are admirably fulfilled. It is to be understood that the foregoing disclosure is given by way of illustrative example only, rather than by way of limitation, and that without departing from the invention, the details may be varied within the scope of the appended claims.

What is claimed is:

1. A power loader comprising a vehicle having a driver's seat, a pair of hollow booms, each in the form of a bell crank lever and arranged respectively on opposite sides on the vehicle and each embodying a rearward short arm pivoted to the vehicle at the side of and near the back of the driver's seat and a long arm extending forwardly therefrom, a load carrying element pivotally mounted on the forward ends of said forwardly extending arms, power means for swinging said booms upwardly from a lowered position in which said load carrying element rests on the ground in front of said vehicle to an elevated position in which said load carrying element is above the vehicle, characterized by the novel feature that said booms are so shaped and the arms thereof so disposed that when in their lower position the rear boom arms extend from their pivots downwardly and the long arms forwardly and when in their elevated position the rear arms extend downwardly and forwardly and the forward arms upwardly, said booms when in all positions being below the driver's shoulders to afford free lateral vision and arm and hand movements of the driver, and linkage means extending longitudinally through said hollow booms and pivotally connected to said load carrying element at a point spaced from the pivotal mounting of the latter on said booms to tilt said load carrying element relative to said arms.

2. A power loader comprising a vehicle having a driver's seat, a pair of hollow booms, each in the form of a bell crank lever and arranged respectively on opposite sides of the vehicle and each embodying a rearward short arm pivoted to the vehicle at the side of and near the back of the driver's seat and a long arm extending forwardly therefrom, a load carrying element pivotally mounted on the forward ends of said forwardly extending arms, power means for swinging said booms upwardly from a lowered position in which said load carrying element rests on the ground in front of said vehicle to an elevated position in which said load carrying element is above the vehicle, characterized by the novel feature that said booms are so shaped and the arms thereof so disposed that when in their lower position the rear boom arms extend from their pivots downwardly and the long arms forwardly and when in their elevated position the rear arms extend downwardly and forwardly and the forward arms upwardly, said booms when in all positions being below the driver's shoulders to afford free lateral vision and arm and hand movements of the driver, and linkage means extending through said hollow booms and pivotally connected to said load carrying element at a point spaced from the pivotal mounting of the latter on said booms to tilt said load carrying element relative to said arms, said linkage means including a lever pivotally mounted intermediate its ends in each of said booms near the rear end of the front arm thereof, a link pivotally connected at one end to one end of said lever and pivotally connected at its other end to said vehicle at a point spaced from the pivotal connection of the arm to the vehicle, a second link pivotally connected at one end to the second end of said lever and extending longitudinally through said boom, and an operative connection from the forward end of said second link to said load carrying element at a point eccentric to the pivotal mounting of the load carrying element.

3. A power loader comprising a vehicle having a driver's seat, a pair of hollow booms, each in the form of a bell crank lever and arranged respectively on opposite sides of the vehicle and each embodying a rearward short arm pivoted to the vehicle at the side of and near the back of the driver's seat and a long arm extending forwardly therefrom, a load carrying element pivotally mounted on the forward ends of said forwardly extending arms, power means for swinging said booms upwardly from a lowered position in which said load carrying element rests on the ground in front of said vehicle to an elevated position in which said load carrying element is above the vehicle, characterized by the novel feature that said booms are so shaped and the arms thereof so disposed that when in their lower position the rear boom arms extend from their pivots downwardly and the long arms forwardly and when in their elevated position the rear arms extend downwardly and forwardly and the forward arms upwardly, said booms when in all positions being below the driver's shoulders to afford free lateral vision and arm and hand movements of the driver, and linkage means extending through said hollow booms and pivotally connected to said load carying element at a point spaced from the pivotal mounting of the latter on said booms to tilt said load carrying element relative to said arms, said linkage means including a lever pivotally mounted intermediate its ends in each of said booms near the rear end of the front arm thereof, a link pivotally connected at one end to one end of said lever and pivotally connected at its other end to said vehicle at a point spaced from the pivotal connection of the arm to the vehicle, a second link pivotally connected at one end to the second end of said lever and extending longitudinally through said boom, and a hydraulic cylinder connecting the forward end of said second link and said load carrying element operable to tilt said load carrying element to and from loading, carrying and unloading positions.

FREDERICK W. ALLAN.

References Cited in the file of this patent

UNITED STATES PATENTS

| Number | Name | Date |
|---|---|---|
| 1,535,381 | Stage | Apr. 28, 1925 |
| 2,417,544 | Coleman | Mar. 18, 1947 |
| 2,482,612 | Drott et al. | Sept. 20, 1949 |
| 2,519,974 | Mork | Aug. 22, 1950 |
| 2,530,414 | Wells | Nov. 21, 1950 |
| 2,537,010 | Andersen | Jan. 9, 1951 |
| 2,538,000 | Hoar et al. | Jan. 16, 1951 |